Figure 1:
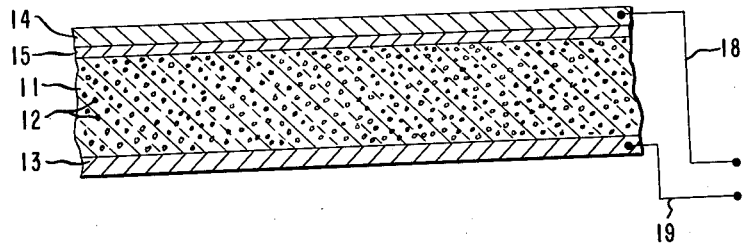

March 21, 1961 D. T. MELOON ET AL 2,976,446
ELECTROLUMINESCENT STRUCTURES
Filed June 23, 1958

INVENTORS
DANIEL THOMAS MELOON
ROBERT OTTO OSBORN
BY Herbert M Wolfson
ATTORNEY

United States Patent Office 2,976,446
Patented Mar. 21, 1961

2,976,446

ELECTROLUMINESCENT STRUCTURES

Daniel Thomas Meloon, East Amherst, and Robert Otto Osborn, Snyder, N.Y., assignors to E. I. du Pont de Nemours and Company, Wilmington, Del., a corporation of Delaware Filed June 23, 1958, Ser. No. 743,567

15 Claims. (Cl. 313—108)

This invention relates to electroluminescent structures and processes for making them.

Electroluminescence, the ability to emit light when excited by a changing electrical field, is a phenomenon exhibited by some so-called phosphors. The light seems to be best produced during the period when voltage across the phosphor is first applied, removed or varied. Electroluminescent structures are characterized by a minimum of three elements; an insulating dielectric material in which particles of the phosphor are distributed and, contiguous thereto and on opposite sides thereof, two electrical conductors. When an alternating voltage is applied across the electrodes, the phosphor particles emit their characteristic light.

It is immediately apparent that one or both of the electrodes must transmit substantial light; otherwise the luminescent effect is substantially lost. The use, therefore, of a very thin, metallic layer for at least one of these electrodes would seem to be a logical solution to the problem. However, reducing the thickness of a metallic layer to increase its transmission of visible light serves to increase the surface resistivity of the layer, with consequent power losses when operating as a component of an electroluminescent structure.

The present invention concerns itself with a solution to this problem. The primary object is to provide a highly light-transmitting flexible metallic layer for electroluminescent structures that is also highly electrically conductive. A further object is a flexible electroluminescent structure incorporating the improvements of the present invention. Other objects will appear hereinafter.

The invention involves using a very thin, substantially electrically non-conductive substrate of copper in combination with a superimposed metallic layer as at least one of the electrically conducting layers in an electroluminescent structure. The use of this thin copper substrate, having an equivalent thickness of approximately 4 to 8 millimicrons and having an electrical surface resistivity of at least $10^8$ ohms per square, permits the construction of metallic layers capable of transmitting at least 30% of all incident visible light and having a surface resistivity of not more than 1000 ohms per square, and in some cases, less than 100 ohms per square, said construction being accomplished by the deposition of a layer of metal onto the aforementioned copper substrate. The layers of these supra-deposited metals (with the exception of copper), when vapor deposited by themselves onto a bare, copper-free dielectric substrate in such quantity that they are capable of transmitting at least 30% of all incident visible light, exhibit surface resistivities ranging from $10^5$ to $10^7$ ohms per square depending on the particular metal employed.

In the structure of the present invention, copper may serve not only as the thin, substantially electrically non-conductive substrate but may also serve in the capacity of the supra-deposited metal. In other words, it is possible to vapor deposit copper on a film and/or dielectric substrate to such an extent that the resulting copper layer exhibits the above stipulated improvements in simultaneous visible light transmission and electrical conductivity. However, the preferred structures of the invention are those in which so-called bimetallic layers are used as at least one of the electrically conducting layers. Such structures, when capable of transmitting at least 30% of incident visible light, exhibit surface resistivities of less than 300 ohms per square. The preferred layers are those in which silver or platinum is deposited over the thin copper substrate.

By "equivalent thickness" in the above written description of the invention is meant that thickness obtained by dividing the weight of metal calculated to have impinged on a surface by the product of the density of the metal in its customary massive state and the area of the surface on which the metal impinged. This thickness may deviate from the actual thickness since there may be areas on an atomic scale that are completely free of metal, while metal may deposit on other areas in thicknesses greater than that indicated by the above calculations.

In the following drawing four alternatives are suggested as embodiments of the present invention. However, it will be obvious that the use of the present invention is not so limited.

Figure 2:
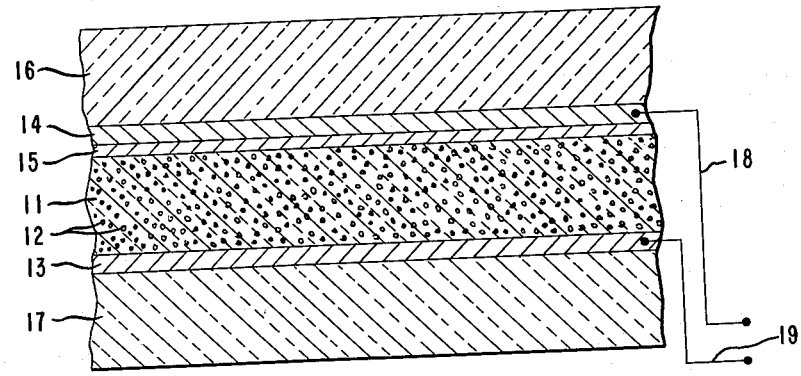
Figures 3, 4:
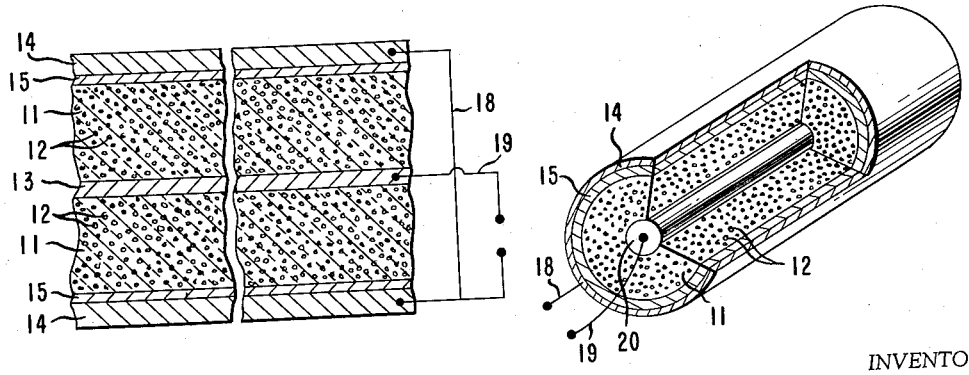

Figure 1 is a cross-sectional view of one electroluminescent structure, the most basic structure, embodying the features of the present invention;

Figures 2 and 3 are cross-sectional views suggesting additional refinements or modifications, Figure 2 representing a modification where the metallic layers are protectively covered, and Figure 3 representing a modification where one electrode is common to two contiguous electroluminescent cells; and Figure 4 is a view in perspective of a cylindrical structure embodying the features of the present invention.

In the figures, numeral 11 designates the phosphor-bearing, dielectric layer, 12 representing particles of the phosphor. Numerals 18 and 19 represent lines which connect the electrodes to a suitable source (not shown) of alternating or pulsating electric current. The dielectric material used may be selected from a variety of substances. It should be a solid or semi-solid dielectric material capable of transmitting substantial light. These include some solidified oils, waxes, resins, plastics, all preferably of good dielectric strength, low power loss and reasonably high dielectric constant.

For use in the present invention and particularly for use in flexible electroluminescent structures, films of thermoplastic polymers are preferred. Among these may be mentioned polyvinyl fluoride, polyvinylidene fluoride, polyethylene terephthalate, polyacrylonitrile, cellulose derivatives such as ethyl cellulose, nitrocellulose, etc. The intensity of light emitted by the phosphor is partially a function of the dielectric constant of the dielectric material. Therefore, the high dielectric constants of polyvinyl fluoride and polyvinylidene fluoride, approximately 7 and 10 respectively, make films of these particular polymers outstanding.

Particles of the electroluminescent phosphor 12 may be incorporated or embedded in the dielectric layer by any means known in the art for incorporating pigments and the like into transparent or translucent plastics and forming sheets therefrom. For example, an activated mixture of zinc oxide and zinc sulfide powders or zinc sulfide powder activated with copper and lead may be dispersed directly in a molten polymer. Thereafter, the molten polymer containing the phosphor particles may be extruded in the form of a thin, self-supporting film. Depending upon the physical requirements of the structure, the film containing the phosphor particles may be oriented by stretching and/or rolling in one or two directions and, if desired, heat-set (heat-treated while maintaining the stretched dimensions). The thickness of the ultimate phosphor-containing film may range from 0.0001 to 0.100 inch, and more in special applications.

Electrode 13 may be either an opaque, reflective, electrically conductive surface (such as a sheet of aluminum foil or the like, a layer of electrically conductive silver or aluminum paint, or a layer of vapor deposited metal; e.g., silver, aluminum) or a light-transmitting, electrically-conductive surface (such as a layer of vapor deposited copper). Electrode 14—15 is a light transmitting, electrically-conductive, bimetallic layer comprising a first deposited, thin, relatively electrically non-conductive substrate 15 of copper plus a supra-deposited layer 14 of of a metal different from copper, said metal layers being as hereinbefore described.

Where a flexible electroluminescent structure is the goal, it is convenient to expose each surface of the dielectric layer in turn to vapors of the metals while maintaining the system under a high vacuum. A surface destined to be light-transmitting is either first exposed to copper vapor in accordance with the first invention, followed by exposure to vapors of silver, zinc, gold, platinum, aluminum or other metals, or may be exposed solely to copper vapor as hereinbefore described. Prior to deposition of any metal, the surfaces of the dielectric layer, or other contiguous film surface to be metallized, must be substantially clean, particularly free of oil. The equivalent thickness of the metallic layer supported by the copper substrate in the case of bimetallic electrodes may range from about 1 to about 11 millimicrons, depending on the particular metal.

In the following table, Table 1, the surface resistivities for various metallic layers deposited on a polyvinyl fluoride film to an extent which permits about 35% transmission of all incident visible light are compared. Each bimetallic layer comprised a first deposited substrate of copper ranging in equivalent thickness from approximately 4–8 millimicrons and exhibiting a surface resistivity of at least $10^8$ ohms per square, plus a supra-deposited layer of the indicated metal in an equivalent thickness in the range of from about 6–10 millimicrons. In the case of the mono-metallic layers, these metals were deposited in equivalent thicknesses averaging about 15 millimicrons, and ranging from about 12 to about 20 millimicrons.

TABLE 1

| Metal | Surface Resistivity of Bimetallic Layers, ohms per square | Surface Resistivity of Mono-Metallic Layers, ohms per square |
| --- | --- | --- |
| Copper | | 25 |
| Silver | 19 | $10^6$–$10^7$ |
| Gold | 100–300 | $10^6$–$10^7$ |
| Aluminum | 50–150 | $10^6$–$10^7$ |
| Beryllium | 50–150 | $5 \times 10^5$ |
| Tungsten | 50–150 | $10^6$–$10^7$ |
| Cadmium | 50–150 | $10^6$–$10^7$ |
| Platinum | 50–150 | $10^6$–$10^7$ |
| Tin | 50–150 | $10^6$–$10^7$ |
| Chromium | 50–150 | $10^6$–$10^7$ |

For the present specification, surface resistivity measurements of the vapor deposited metal layers were made by first cutting a piece of the desired film sample 1" wide by 1½" long. On the metallized surface of this piece were painted two silver electrodes, 1" long, each having one absolutely straight edge, said straight edges being mutually parallel and exactly 1" apart. These straight edges were perpendicular to the longitudinal axis of the film sample. The electrodes were made by applying Conductive Silver Coating No. 4922* to the metallized surfaces. The probes of an RCA Voltohmyst,

*A suspension of finely divided silver in a solvent/resin vehicle, available from E. I. du Pont de Nemours & Co., Wilmington, Delaware.

model WV–97A were touched one to each silver electrode, and the resistance in ohms, indicated on the Voltohmyst on a scale selected to give approximately a half-scale deflection, was recorded. Since the configuration of the area bounded by the silver electrodes and the cut edges of the film sample was square, this ohmmeter reading was the surface resistivity of the sample in ohms per square.

Light transmission was measured with a GE Guardian PR–2 Exposure Meter. First, a reading was taken with a sample of the thermoplastic film to be metallized held over the aperture of the meter, said aperture being directed at a fixed source of visible light, said meter being held at a fixed distance from said source. This reading we shall call $T_0$. After the film sample had been metallized, it was again placed over the aperture of the exposure meter and another reading taken in the same manner as before. This reading we shall call $T_1$. The percent visible light transmitted by the layer of metal itself is calculated as $$\frac{T_1}{T_0} \times 100$$

As shown in Figure 2, it may be desirable to protect the electrode layers 13 and 14. For this purpose any solid insulating material may be used as the protective layers 16 and 17. High flexural strength, moisture resistance, resistance to abrasion and resistance to staining make films of oriented polyethylene terephthalate, polyvinyl fluoride, polyvinylidene fluoride and oriented polyacrylonitrile particularly useful as protective layers. The latter three polymers, because of high resistance to degradation by outdoor weathering, are preferred in the production of weather-resistance electroluminescent structures. It should be understood that when a protective layer of thermoplastic polymeric film is used, the metallic layer may be deposited on this protective layer or on the phosphor-containing intermediate layer prior to assembling the complete structure. This option is particularly useful when the phosphor-bearing layer is a semi-solid, such as wax.

The modification shown in Figure 3 depicts a structure wherein opaque reflective electrode 13 serves as a common electrode in a sandwich comprising two electroluminescent cells as hereinbefore described. Such a structure may serve as a room divider, emitting light from both sides. If desired, additional layers, which are not shown, may be used to protect the metallic layers in a manner similar to that shown in Figure 2.

In addition to the more conventional electroluminescent structures described hereinbefore and represented by Figures 1, 2 and 3, this invention may be employed in the construction of electroluminescent structures of circular cross-section. Such a construction is represented by Figure 4 in which the cylindrically shaped, phosphor-bearing dielectric layer 11 is formed around solid electrode 20, which may be a small diameter rod of metal, e.g., aluminum. The other electrode is light transmitting and may either be the vapor deposited bimetallic layer 14—15 as hereinbefore described, or may be a vapor deposited, highly electrically conductive, light-transmitting layer of copper as hereinbefore described. Layer 11 may be prepared by injection molding techniques employing phosphor-containing polymeric melts, or by variations of the organosol coalescing technique described in Example I of this specification.

The modification shown in Figure 1 does not necessarily require an adhesive to form the electroluminescent structure. However, those shown in Figures 2 and 3 would require adhesives to assemble the structure, unless in situ film-forming techniques are employed. Any suitable adhesives known to those in the art may be used for this purpose. Obviously, for the light-transmitting surface or surfaces, the adhesive employed should be substantially transparent upon drying.

Useful adhesives may be selected from the following: a cement of neoprene and phenol-formaldehyde resin in toluene; polyvinyl-butyral resins such as "Butvar" HX [1]; epoxy resin type adhesives such as R-313 [2], "Hysol" 2040 [3], and "Bondmaster" 648 [4]; silicone based adhesives such as "Flexrock" No. 80 [5] and C-269 Adhesive [6]; modified synthetic rubber type adhesives such as 4684 [7]; polyester type adhesives such as 46950, 46960, 46970 and 46971 [7]; and the acrylate adhesives such as those disclosed in U.S. Patent No. 2,464,826, etc. A treatment to improve adherability of thermoplastic polymeric materials, such as the treatment with boron trifluoride and an oxidizing agent as disclosed in U.S. patent application Serial No. 700,953, filed December 6, 1957, to R. O. Osborn may be used on any of the surfaces to which metallic layers must be adhered.

Electroluminescent structures of the present invention will find utility in both household and commercial applications. Wall and ceiling panels for homes, factories and offices, radio and telephone dials, instrument panels, and the faces of clocks are ideally suited for construction with electroluminescent structures. Sufficient night illumination for light switches, electrical outlets, push panels on doors, stair risers, etc., provide a contribution to safety by these electroluminescent structures. Lamp shades, room dividers, table tops, curtains and drapes of electroluminescent materials will provide unique aesthetic lighting effects. The outdoor variety, adaptable from the modification shown in Figure 2, can be used to provide signs and illuminated displays.

These structures, particularly the flexible electroluminescent structures, can be made in continuous lengths and sold in convenient roll form. They have the advantages of low cost, light weight, the ability to conform to curved or planar surfaces; and they can be cut easily into all shapes and sizes.

Other uses and advantages will be apparent from the following examples.

*Example I*

Twenty-seven parts of particulate polyvinyl fluoride and 22 parts of an electroluminescent phosphor comprising zinc sulfide activated with copper and arsenic (250–300 mesh), were slowly added to a Waring Blendor containing 51 parts of gamma-butyrolactone, the blender operating at a speed of 500–1000 revolutions/minute. After 15 minutes of mixing in the blender, the resulting dispersion was poured into a shallow dish and subjected to a high vacuum for about 8 hours. The dispersion was then spread on a flat, polished ferrotype plate and placed for about three minutes in an oven maintained at a temperature of 180–190° C. The plate, upon which a translucent gel film had formed, was then immersed in cold water. The film was stripped from the plate, clamped in a frame and then placed in a forced-air circulation oven. After the gamma-butyrolactone had been volatilized, the film was taken from the oven, quenched again in cold water and removed from the frame.

The phosphor-bearing polyvinyl fluoride film, approximately 3 mils thick, was exposed for 15 seconds at room temperature to an atmosphere comprising 33% by volume of boron trifluoride and 67% by volume of oxygen in the manner described in U.S. patent application Serial No. 700,953. Then, an almost indiscernible layer of copper, about 6 millimicrons in equivalent thickness, was deposited on one surface of the film by exposing the surface to copper vapor at a temperature of approximately 1100° C. and under an absolute pressure of less than 0.5 micron of mercury for 1–2 minutes. Thereafter, the same surface was exposed to silver vapor at substantially the same conditions for 1–2 minutes to deposit a stratum of silver, approximately 9 millimicrons in equivalent thickness, over the copper substrate. On the opposite surface of the polyvinyl fluoride film, a substantially opaque, reflective aluminum coating was vapor-deposited to an equivalent thickness of approximately 40 millimicrons.

The resulting structure was clamped between two mutually insulated rectangular brass frames. A 60-cycle alternating potential of 110 volts was applied across the brass frames causing the structure to glow brightly through the silver-copper surface layer. By the tests previously described, it was determined that the surface resistivity of this layer was approximately 22 ohms per square and the layer transmitted about 55% of the visible light incident thereon.

*Example II*

One surface of the phosphor-bearing polyvinyl fluoride film, prepared as in Example I, was exposed to copper vapor for about 2 minutes in the manner described in Example I to provide a copper layer of 11 millimicrons equivalent thickness. This layer exhibited a surface resistivity of 1000 ohms per square and transmitted about 55% of the incident visible light. On the opposite surface, a silver-over-copper combination layer was deposited as described in Example I. No special adherability treatment was used.

The electroluminescent cell produced, when framed in the manner previously described and across which a 60-cycle alternating potential of 400 volts was applied, glowed brilliantly from both sides.

*Example III*

Two samples of oriented polyvinyl fluoride film, each 1 mil thick, were treated with boron trifluoride and oxygen in the manner described for Example I. One surface of one sample was coated with a silver-over-copper layer as described previously. One surface of the other sample was coated with a substantially opaque reflective aluminum layer.

These metallized samples of polyvinyl fluoride film were laminated on either side of a phosphor-bearing polyvinyl fluoride film, the metallic layers innermost, to form a structure similar to that shown in Figure 2. The phosphor-containing polyvinyl fluoride film was 3 mils thick and had been prepared as in Example I. "Hysol" 2040 epoxy resin adhesive was used to form the laminate.

An unlaminated selvage, approximately ½ inch deep, was maintained around the edges of the metallized film to permit insertion of aluminum foil electrodes. Under the influence of an alternating 60-cycle potential of 110 volts, the structure glowed uniformly over its entire surface with a soft green light.

*Example IV*

A phosphor-containing polyvinyl fluoride film, 3 mils thick, was prepared and treated with boron trifluoride and oxygen as in Example I. A silver-over-copper layer was vapor deposited on one surface of the film as in Example I. The resulting film was cut in half and the two halves were laminated on either side of an 0.5 mil thick aluminum foil, the metallized surfaces outermost. The epoxy resin adhesive was used to form the laminate.

The framing technique described in Example I using two rectangular brass frames insulated from each other as well as from the foil ply was employed to apply a 60-cycle alternating potential of 110 volts between the aluminum foil centerply and each bimetallic electrode. The electroluminescent structure emitted a soft green glow from both sides.

---

[1] Manufactured by Shawinigan Products Corp., New York, N.Y.
[2] Manufactured by C. H. Biggs Corp., Los Angeles, Calif.
[3] Manufactured by Houghton Laboratories, Inc., Olean, N.Y.
[4] Manufactured by Rubber & Asbestos Corp., Bloomfield, N.J.
[5] Manufactured by Flexrock Company, Philadelphia, Pa.
[6] Manufactured by Dow Corning Corp., Midland, Mich.
[7] Manufactured by E. I. du Pont de Nemours & Co., Wilmington, Del.

Example V

Two samples of oriented polyethylene terephthalate film, prepared in accordance with the disclosure of U.S. Patent 2,823,421, were exposed for 15 seconds at room temperature to an atmosphere comprising 33% by volume of boron trifluoride and 67% by volume of oxygen in the manner previously described. On one surface of one sample a silver-over-copper layer was vacuum deposited as described in Example I. On one surface of the other sample an opaque reflective aluminum layer was deposited. Using "Hysol" 2040 epoxy resin adhesive, the metallized samples of polyethylene terephthalate were laminated on either side of a phosphor-containing polyvinyl fluoride film, metallic layers innermost. The phosphor-containing polyvinyl fluoride film was prepared as in Example I.

An unlaminated selvage, approximately ½ inch deep, was maintained around the edges of the metallized film to permit insertion of aluminum foil electrodes. Under the influence of an alternating 60-cycle potential of 400 volts, the structure glowed uniformly over its entire surface with a bright green glow.

Example VI

A dielectric binder was prepared by stirring 150 grams of ethyl cellulose into a mixture comprising 518 grams of amyl alcohol, 250 grams of xylene, 70 grams of castor oil and 1.5 grams of octyl phenol. The resulting blend was filtered by passing it through felt. Ten parts of this dielectric binder were blended in a ball mill with 5 parts of an electroluminescent phosphor comprising a zinc sulfide activated with copper and arsenic (250–300 mesh). The resulting blend of dielectric binder and phosphor was spread on the metallized surface of a polyvinyl fluoride film. The metallized coating was a bimetallic layer of silver-over-copper deposited by vapor deposition as in Example I. The phosphor-containing dielectric binder coating was doctored to a thickness of approximately 25 mils, deaerated by placing in a vacuum bell jar for several hours and then allowed to air-dry overnight at room temperature. Substantially all of the amyl alcohol and xylene were volatilized during this overnight exposure.

The next day, conducting silver paint was applied over the air-dried, phosphor-bearing, dielectric binder layer. After approximately 1 hour in a 50° C. oven, the coating of silver paint was dry. The resulting silver electrode was substantially opaque and highly reflective.

A 400-cycle alternating potential of 750 volts was impressed across the electrodes of the cell to produce a very bright green glow uniformly over the entire surface.

Example VII

The procedure described for Example VI was repeated using oriented polyethylene terephthalate film in place of the polyvinyl fluoride film. The resulting electroluminescent cell operated in a similarly satisfactory manner.

Example VIII

Twenty-five parts of particulate polyvinylidene fluoride and 20 parts of an electroluminescent phosphor comprising zinc sulfide activated with copper and arsenic 250–300 mesh), were slowly added to a Waring Blendor containing 50 parts of gamma-butyrolactone, the blender operating at a speed of 500–1000 r.p.m. After 15 minutes of mixing in the blender, the resulting dispersion was poured into a shallow dish and subjected to a high vacuum for about 8 hours. The dispersion was then spread on a flat, polished ferrotype plate and placed for about 3½ minutes in an oven maintained at a temperature of 185–195° C. The plate, upon which a translucent gel film had formed, was then immersed in cold water. The film was stripped from the plate, clamped in a frame and then placed in a forced-air circulation oven. After the gamma-butyrolactone had been volatilized, the film was taken from the oven, quenched again in cold water and removed from the frame.

The phosphor-bearing polyvinylidene fluoride film, approximately 3½ mils thick, was treated with boron trifluoride and oxygen as in Example I. Then, an almost indiscernible layer of copper, about 5–6 millimicrons in equivalent thickness, was deposited on one surface of the film following the procedure described in Example I. Thereafter, the same surface was exposed to platinum vapor at substantially the same conditions for about 2 minutes to deposit a stratum of platinum, approximately 8 millimicrons in equivalent thickness over the copper substrate. On the opposite surface of the polyvinylidene fluoride film, a substantially opaque, reflective aluminum coating was vapor-deposited to an equivalent thickness of approximately 40 millimicrons.

The resulting structure was clamped between two mutually insulated rectangular brass frames. A 60-cycle alternating potential of 110 volts was applied across the brass frames causing the structure to glow brightly through the platinum-copper surface layer. By the test previously described, it was determined that the surface resistivity of this layer ranged in the vicinity of 50–150 ohms per square and transmitted about 35% of the visible light incident thereon.

As many widely different embodiments may be made without departing from the spirit and scope of this invention, it should be understood that the invention is not limited except as defined in the appended claims. For example, it will be obvious to one skilled in the art that, where flexibility is not required of an electroluminescent structure, the phosphor particles need not be dispersed in a flexible insulating dielectric layer. The phosphor may be in the form of a continuous, non-granular layer, vapor-deposited in accordance with techniques described in U.S. Patent 2,709,765, onto any of the hereinbefore described substrates, on which has been previously deposited either an opaque metallic, electrically conductive layer or a light-transmitting, electrically conductive metallic layer in accordance with the hereinbefore disclosed invention. In this latter case, the electroluminescent structure would be completed by interposing a suitable light-transmitting dielectric layer between the phosphor layer and the remaining electrode. The separate dielectric and phosphor layers would thus comprise the phosphor-containing layer as defined by the present invention.

Having fully disclosed the invention, what is claimed is:

1. An electroluminescent structure comprising a layer of a dielectric material, particles of a phosphor material distributed throughout said dielectric layer and electrically conductive metallic layers on either side of said phosphor-containing dielectric layer, at least one of said metallic layers comprising a thin substantially transparent layer of copper having an equivalent thickness of 12–20 millimicrons in contact with said phosphor-containing layer, said metallic layer capable of transmitting at least 30% of all incident visible light and exhibiting a surface resistivity of not more than 1000 ohms per square.

2. An electroluminescent structure comprising a layer of a dielectric material, particles of a phosphor material distributed throughout said dielectric layer and electrically conductive metallic layers on either side of said phosphor-containing dielectric layer, at least one of said metallic layers composed of a thin, substantially electrically nonconductive copper substrate, in combination with a stratum of another metal selected from the group consisting of silver, zinc, gold, aluminum, beryllium, tungsten, cadmium, platinum, tin and chromium, said combination capable of transmitting at least 30% of all incident visible light and exhibiting a surface resistivity of less than 300 ohms per square.

3. An electroluminescent structure as in claim 2 wherein both electrically conductive metallic layers contain said thin copper substrate in combination with a stratum of said other metal.

4. An electroluminescent structure as in claim 2 wherein said stratum of another metal in combination with said copper substrate is a stratum of silver.

5. An electroluminescent structure as in claim 2 wherein said stratum of another metal in combination with the copper substrate is a stratum of platinum.

6. An electroluminescent structure as in claim 2 wherein said copper substrate has an equivalent thickness of 4–8 millimicrons and said stratum of another metal has an equivalent thickness of 1–11 millimicrons.

7. A flexible electroluminescent structure comprising a layer of a thermoplastic polymeric self-supporting film, particles of a phosphor material distributed throughout said layer of polymeric film and electrically conductive metallic layers on either side of said phosphor-containing polymeric film layer, at least one of said metallic layers comprising a thin layer of copper having an equivalent thickness of 12–20 millimicrons in contact with said phosphor-containing film, said metallic layer capable of transmitting at least 30% of all incident visible light and exhibiting a surface resistivity of not more than 1000 ohms per square.

8. A flexible electroluminescent structure comprising a layer of a thermoplastic polymeric self-supporting film, particles of a phosphor material distributed throughout said layer of polymeric film and electrically conductive metallic layers on either side of said phosphor-containing polymeric film layer, at least one of said metallic layers composed of a thin, substantially electrically non-conductive copper substrate, in combination with a stratum of another metal selected from the group consisting of silver, zinc, gold, aluminum, beryllium, tungsten, cadmium, platinum, tin and chromium, said combination capable of transmitting at least 30% of all incident visible light and exhibiting a surface resistivity of less than 300 ohms per square.

9. A flexible electroluminescent structure as in claim 8 wherein said thermoplastic polymeric film is a polyvinyl fluoride film.

10. A flexible electroluminescent structure as in claim 8 wherein said thermoplastic polymeric film is a polyvinylidene fluoride film.

11. A flexible electroluminescent structure as in claim 8 wherein both electrically conductive metallic layers contain a thin copper substrate in combination with a stratum of said other metal.

12. A flexible electroluminescent structure as in claim 8 wherein said stratum of another metal in combination with the copper substrate is a stratum of silver.

13. A flexible electroluminescent structure as in claim 8 wherein said stratum of another metal in combination with the copper substrate is a stratum of platinum.

14. A flexible electroluminescent structure as in claim 8 wherein said copper substrate has an equivalent thickness of 4–8 millimicrons and said stratum of another metal has an equivalent thickness of 1–11 millimicrons.

15. An electroluminescent structure comprising a phosphor-containing layer and electrically conductive metallic layers on either side of said phosphor-containing layer, at least one of said metallic layers comprising a thin layer of copper having an equivalent thickness of 12–20 millimicrons in contact with said phosphor-containing layer, said metallic layer capable of transmitting at least 30% of all incident visible light and exhibiting a surface resistivity of not more than 1000 ohms per square.

References Cited in the file of this patent

UNITED STATES PATENTS

| | | |
|---|---|---|
| 2,566,349 | Mager | Sept. 4, 1951 |
| 2,709,765 | Koller | May 31, 1955 |